United States Patent Office 3,806,463
Patented Apr. 23, 1974

3,806,463
MICROCAPSULES FOR CARBONLESS
COPYING PAPER
Akio Konishi, Masaaki Takahashi, Fumihiro Kimura, and Takehisa Toguchi, Tokyo, Japan, assignors to Kureha Kagaku Kogyo Kabushiki Kaisha, Tokyo, Japan
No Drawing. Filed July 7, 1971, Ser. No. 160,533
Claims priority, application Japan, July, 11, 1970, 45/60,473; Sept. 2, 1970, 45/76,524, 45/76,525; Apr. 20, 1971, 46/24,938, 46/24,939, 46/24,940, 46/24,941, 46/24,942, 46/24,943, 46/24,944
Int. Cl. B01j 13/02; C09b 67/00
U.S. Cl. 252—316    3 Claims

ABSTRACT OF THE DISCLOSURE

Microcapsules for use in the production of carbonless copying paper. The microcapsules contain a dye composition comprising (a) a solvent selected from one or more alkylnaphthalenes of the general formula:

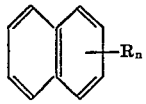

wherein R represents $C_1$–$C_4$ alkyl group, $n$ is an integer of 1–4, and R may be same or different when $n$ is 2–4, the total number of carbon atoms in R's being 4–6, (b) mineral oils and (c) a dye which develops color under acidic condition. Carbonless copying papers produced from such microcapsules exhibit excellent color development and are nontoxic and biodegradable thus causing no environmental pollution when they are discarded.

---

This inveniton relates to microcapsules which are applied onto paper in the production of carbonless copying paper. More particularly, this invention relates to microcapsules which are composed of 100 parts of one or more alkylnaphthalenes of the general formula:

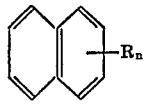

wherein R represents $C_1$–$C_4$ alkyl group, $n$ is an integer of 1–4, and R may be same or different when $n$ is 2–4, with the total number of carbon atoms in said R's being 4–6, 0–100 parts of a mineral oil and 0.5–1.5 parts of a dye which develops color under acidic conditions.

DESCRIPTION OF THE PRIOR ART

In recent years, a great deal of carbonless copying paper has been produced by dissolving dye in various solvents and applying them onto paper after microcapsulation. Although many kinds of solvent have been proposed for this purpose, polychlorobiphenyl (referred to hereinafter simply as PCB) has been used widely, considering dye solubility, viscosity and color-developing. However, the use of PCB is now publicly criticized, since it has low biodegradability and accumulates, as does DDT and BHC, in the bodies of many animals, thus ultimately proving harmful to human beings. Moreover, copying papers using PCB generate PCB vapor and hydrogen chloride when discarded and burnt, which causes troubles such as corrosive damage to the incinerator or other burning apparatus and environmental pollution. In addition, the use of PCB as a solvent for dyes creates problems of light stability in both the microcapsules and the developed color.

For color development of dyes, acidic materials of inorganic solids such as acid clay have been used widely. In recent years, however, acidic resins such as phenol resin have been in use. Acidic resins are said to have such characteristics that they are not affected by adsorption of moisture and reactive substances in the air and are more easily applied than acid clay. However, in using a resin system it is necessary to use a solvent which has a good affinity to the resin, an excellent dye solubility and an adequate viscosity in order to obtain satisfactory color development.

SUMMARY OF THE INVENTION

Accordingly, it has become desirable to find a solvent which is excellent in dye solubility, light stability and color-developing ability, but one which is devoid of toxicity and will not cause environmental pollution.

It is a purpose of this invention to provide a new solvent for dyes in microcapsules used in producing carbonless copying paper, which satisfy the demands mentioned above. It is another purpose of this invention to provide carbonless copying papers which are devoid of any defect described above and have been produced by applying the microcapsules onto paper. According to the invention microcapsules for use in producing carbonless copying paper can be obtained, by using as solvent for the dyes used in the production of the microcapsules one or more alkylnaphthalenes of the general formula:

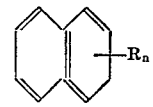

wherein R represents $C_1$–$C_4$ alkyl group, $n$ is an integer of 1–4, and R may be same or different when $n$ is 2–4, with the proviso that the total number of carbon atoms in R must be 4–6. Carbonless copying papers devoid of any defect described above can be produced by applying these microcapsules onto paper.

DETAILED DESCRIPTION OF THE INVENTION

The alkylnaphthalenes represented by the general formula include butylnaphthalene, dimethylpropylnaphthalene, methylbutylnaphthalene, ethylpropylnaphthalene, methylpropylnaphthalene, diethylnaphthalene, dimethylbutylnaphthalene, dimethylethylnaphthalene, trimethylpropylnaphthalene, and the like.

The above mentioned compounds used as the solvent in this invention are of course well known to have a number of isomers which are different only in the positions substituted. The solvent used may be a mixture of any of the compounds represented by the general formula previously shown. The alkylnaphthalenes used in this invention are defined as above for optimum results. If the total number of carbon atoms in the substituted alkyl groups is smaller than 4 the dye solubility will be satisfactory but the odor will be undesirable. When the total number of carbon atoms in the substituted alkyl groups is larger than 6 the aromaticity will be decreased but the viscosity will increase with the increase in molecular weight, thereby causing troubles in microcapsulation and unsatisfactory results in dye solubility.

The alkylnaphthalenes used in this invention can be produced according to a known conventional process. For example, the alkylnaphthalenes can be prepared by reacting naphthalene, methylnaphthalene or the like alone or in mixture with a lower olefin in the presence of an acid catalyst to effect alkylation. Considering the fact that there is no necessity of using pure substances, a crude starting material such as a mixture of naphthalene, methylnaphthalene, etc., for example, fractions abounding in naphthalene, methylnaphthalene and dimethylnaphthalene such as bottom oil obtained by thermal cracking of petroleum at high temperatures, catalytic reformate bottom oil of naphtha, coal tar fraction and bottom oil obtained by dealkylation of polyalkylbenzenes can be used as starting material for alkylation. When these crude starting materials are used, it is of course necessary to add a purification step to eliminate impurities prior to alkylation. Even in the event that among the compounds represented by said general formula a substance which is solid at ordinary temperature in pure form were included in the solvent used in this invention, it would have no detrimental affect on this invention and the production of the microcapsules for carbonless copying paper.

Mineral oils, which are one of the components used in the dye composition contained in the microcapsules of this invention, are used not only in decreasing the cost of producing the microcapsules, but also as a solution viscosity adjusting agent. These mineral oils generally include kerosine, gas oil, insulating oil and lubricant oil but may be alkylbenzenes or diarylmethanes and alkyl derivatives thereof. The mineral oils are used in an amount of 0–100 parts, preferably 20–80 parts per 100 parts of said alkylnaphthalene.

Dyes used in the microcapsules for carbonless copying paper are selected from leuco dyes which give color under acidic conditions, such as Methyl Violet, Crystal Violet, Malachite Green, Rhodamine B, o-hydroxybenzalacetophenone, Michler's hydrol derivative, indole pyromellitate derivatives, fluorane derivative, etc. These dyes are used generally in a concentration within the range of 0.5–15%, preferably 1–8%.

Adopted for the production of microcapsules of this invention are the processes disclosed in U.S. Pats. 2,548,366; 2,800,457 and 2,800,458. One example of the generally adopted processes comprises emulsifying a solution of said dye in an alkylnaphthalene of the general formula into a mixed aqueous solution of gelatin and gum arabic, and then forming capsulated colloids around the emlsified oily droplets according to the coacervation method. The resulting microcapsule emulsion containing fine oily droplets of the dye solution is advantageously used for carbonless copying paper by applying the emulsion onto paper.

As developers which attain color development by adsorbing the dye used in the microcapsules, there can be used inorganic acidic materials such as bentonite, zinc oxide, kaolin, clay, active clay, acid clay, zeolite, talc, colloidal silica, etc. and acidic polymers such as phenolaldehyde resin, maleic acid-rosin resin, hydrolysis product of styrene-maleic anhydride copolymer, hydrolysis product of ethylene-maleic anhydride copolymer, carboxypolyethylene, hydrolysis product of vinyl methyl ether-maleic anhydride copolymer, etc. A lower sheet of the carbonless copying paper can easily be manufactured by applying a layer of the developer onto the surface of paper.

As described above, the alkylnaphthalenes used as solvent for producing the microcapsules of this invention are less toxic as compared with the known conventional solvents of PCB series and exhibit improved color development and light stability. The improvement in color development is especially remarkable when an acidic resin is used. When carbonless copying papers produced by application of the microcapsules of this invention are discarded and burnt, such carbonless copying paper can be handled as in the case of ordinary paper, unlike conventionally used carbonless copying paper containing PCB. In the case of this invention, therefore, there is no danger of environmental pollution caused by generation of toxic vapor or hydrogen chloride. Thus, the effect of this invention is indeed significant.

For reference's sake, the results of toxicity tests using PCB and the alkylnaphthalene of this invention are shown in the following Table 1 which illustrates that the degree of safety exhibited by the product of this invention is found obviously superior to that of PCB.

TABLE 1.—ACUTE TOXICITY

| | $LD_{50}$ per oral | $LD_{50}$ cutaneous |
| --- | --- | --- |
| Dipropylnaphthalene, ml./kg... | 9.5 | [1] 30 |
| PCB, ml./kg | 1.7 | 1.25 |

[1] Or more.

Used as test animal are Strain ICR–JCL Mice (Nippon Clea Co., Ltd.).

EXAMPLE 1

The physical properties, dye solubility, odor and color of alkylnaphthalenes used in this invention are shown in Table 2 in comparison with those of the conventionally used PCB. As is evident from the table, the alkylnaphthalenes used in this invention are especially excellent in odor, and the same in dye solubility and color as compared with PCB.

TABLE 2

| Alkyl group(s) of alkylnaphthalene | Boiling point, °C. | Refractive index $n_e^{20}$ | Specific gravity, $d_4^{15}$ | Viscosity, cst., 100° F. | Dye solubility | Odor | Color |
| --- | --- | --- | --- | --- | --- | --- | --- |
| Butyl- | 280–290 | 1,578 | 0.975 | 4.2 | A | A | None. |
| Diethyl- | 280–290 | 1,587 | 0.987 | 3.6 | A | B | Do. |
| Methyl propyl | 280–290 | 1,585 | 0.986 | 4.0 | A | A | Do. |
| Dimethyl propyl | 295–305 | 1,584 | 0.973 | 5.1 | A | A | Do. |
| Ethyl propyl | 295–305 | 1,578 | 0.971 | 5.2 | A | A | Do. |
| Methyl butyl | 295–305 | 1,576 | 0.968 | 5.0 | A | A | Do. |
| Dipropyl | 297–300 | 1,570 | 0.966 | 8.5 | A | A | Do. |
| PCB | | | | | A | C | Do. |

Remarks.—A = Excellent, B = Good, C = Poor.

To a solution of 36 g. of gum arabic dissolved in 108 g. of water was added a solution of a dye (dye concentration: 6%) of 4.7 g. of crystal violet lactone and 2.9 g. of benzoyl leucomethylene blue dissolved in 126 g. of an alkylnaphthalene shown in Table 2, and the mixture was emulsified under agitation. To this emulsion, a sol which had an isoelectric point of pH 8 and was composed of 36 g. of gelatin dissolved in 180 g. of water was added with stirring and, after the pH of the mixture was raised to 9 with caustic soda, 900 g. of warm water were added. Acetic acid was then added to the mixture to lower the pH to 4.3 thereby causing coacervation. Gelatin and gum arabic adhered around the dye-containing oily droplets and the formation of a film of dense liquid was observed. Then 6.8 g. of 37% formalin was added as a hardener and the mixture was cooled to allow the liquid film to gel. Finally, the pH was raised to 9.5 with addition of caustic soda and maintained at 9.5 for 4 hours. The dense liquid film was hardened completely to form microcapsules. The resulting microcapsules were applied onto one side of paper in an amount of 5 g./m.² with and dried with hot air to prepare an upper sheet. On the other hand, lower sheet was prepared by coating paper with acid clay. In a similar way, another lower sheet was prepared by coating paper with phenol-formaldehyde resin. Next, microcapsules were prepared in a similar procedure described above using PCB as the solvent for dye and the microcapsules were applied onto paper to prepare a control carbonless copying paper.

The carbonless copying paper thus obtained, consisting of the upper sheet and the lower sheet were color-developed by way of handwriting or typewriting and the results are summarized in Table 3 (with the lower sheet containing acid clay) and in Table 4 (with the lower sheet containing phenol-formaldehyde resin). As is obvious from these tables, the carbonless copying papers obtained using the alkylnaphthalenes of this invention are excellent.

TABLE 3

| Alkyl group(s) of alkylnaphthalene | Odor | Color development | Light stability |
|---|---|---|---|
| Butyl-naphthalene | A | A | A |
| Diethyl- | B | A | A |
| Methyl propyl | A | A | A |
| Dimethyl propyl | A | A | A |
| Ethyl propyl | A | A | A |
| Methyl butyl | A | A | A |
| Dipropyl | A | A | A |
| PCB | C | A | C |

Light stability was determined by exposing the upper sheet of the dye-containing carbonless copying paper for 10 hours to irradiation from a light resistance tester using a xenon lamp as light source and then bringing the upper sheet in combination with the lower sheet to coloration. It was observed that the upper sheet of this invention still kept the color-producing ability while that prepared using PCB scarcely did.

TABLE 4

| | Odor | Color development | Light stability |
|---|---|---|---|
| Butyl-naphthalene | A | A | A |
| Methyl-propyl | A | A | A |
| Pentyl | A | A | A |
| Dimethyl propyl | A | A | A |
| Ethyl propyl | A | A | A |
| Methyl butyl | A | A | A |
| Dipropyl | A | A | A |
| PCB | C | B | C |

EXAMPLE 2

Dipropylnaphthalene and propylmethylnaphthalene were chosen as the solvent from the alkylnaphthalenes shown in Table 1 and were used to form mixed solvents in the proportion as shown in Table 5. When carbonless copying papers were prepared using these mixed solvents in a similar procedure to that described in Example 1, satisfactory results were obtained as in the case of using them alone. The results are shown in Table 6.

TABLE 5

| | $d_4^{15}$ | $n_D^{25}$ | Nest 100° F. |
|---|---|---|---|
| Dipropylnaphthalene 8, propylmethylnaphthalene 2 | 0.970 | 1.573 | 8.5 |
| Dipropylnaphthalene 7, propylmethylnaphthalene 3 | 0.972 | 1.574 | 6.6 |
| Dipropylnaphthalene 6, propylmethylnaphthalene 4 | 0.974 | 1.576 | 6.1 |

TABLE 6

Acid clay-treated lower sheet

| | Odor | Color development | Light stability |
|---|---|---|---|
| 8/2 | A | A | A |
| 7/3 | A | A | A |
| 6/4 | A | A | A |

Phenol-formaldehyde resin-treated lower sheet

| | | | |
|---|---|---|---|
| 8/2 | A | A | A |
| 7/3 | A | A | A |
| 6/4 | A | A | A |

EXAMPLE 3

To an aqueous solution of 800 g. of gelatin and 960 g. of gum arabic dissolved in 8000 ml. of warm water was added a dye-containing oily solution of 87 g. of crystal violet acetone and 57 g. of benzoyl-leucomethylene blue dissolved in 2400 g. of a mixed oil of an alkylnaphthalene shown in Table 1 with commercially available kerosene (boiling point: 180–270° C., $d_4^{15}$ 0.7976, $n_D^{25}$ 1.4403, viscosity: 1.65 cst., 100° F. and 0.80 cst., 210° F., pour point: −32.5° C., flash point: 72° C) in the proportions as shown in Table 7. The mixture was emulsified with stirring to form an oily emulsion containing oily droplets of 2–6μ. Warm water was added to this emulsion to make the total volume to 32 liters and then 10% aqueous solution of acetic acid was added with stirring to lower the pH to 4.2. For the purpose of hardening, 800 ml. of 37% formalin were added and, after standing at 40° C. for 1 hour, the temperature was lowered to 5° C. to effect gelation. A 10% aqueous solution of caustic-soda was added to raise the pH to 9.0 and the microcapsules were hardened completely. To the microcapsules of this invention thus obtained, cellulose powder and starch were added and the mixture was applied onto paper by the ad of a test coater to prepare an upper sheet with a coated amount of 6 g./m.² When this upper sheet was used with a commercially available lower sheet of carbonless copying paper (inorganic developer; clay paper), it was found that the quality of this carbonless copying paper was excellent as in the case of Example 1. This upper sheet was also found excellent when used with a commercially available lower sheet, as in the case of using a single solvent. The results are shown in Table 8 below.

TABLE 7

| Alkylnaphthalene | Amount used, g. | Amount of kerosene mixed, g. | Kerosene/alkylnaphthalene |
|---|---|---|---|
| Butylnaphthalene | 1,800 | 600 | 33/100 |
| Diethylnaphthalene | 1,800 | 600 | 33/100 |
| Methylpropylnaphthalene | 1,800 | 600 | 33/100 |
| Dimethylpropylnaphthalene | 1,800 | 600 | 33/100 |
| Ethylpropylnaphthalene | 1,800 | 600 | 33/100 |
| Methylbutylnaphthalene | 1,800 | 600 | 33/100 |
| Dipropylnaphthalene | 2,000 | 400 | 20/100 |

TABLE 8

| Alkylnaphthalene | Odor | Dye solubility | For clay | | For resin | |
|---|---|---|---|---|---|---|
| | | | Color development | Light stability | Color development | Light stability |
| Butyl | With mineral oil | ≈A | A | A | A | A |
| Diethyl | do | A | A | A | A | A |
| Methylpropyl | do | A | ≈ | A | A | A |
| Dimethylpropyl | do | ≈ | A | A | ≈ | A | ≈A |
| Ethylpropyl | do | A | A | A | A | A |
| Methylbutyl | do | A | A | A | A | A |
| Dipropyl | do | A | A | A | A | A |

EXAMPLE 4

A fraction boiling at 200–300° C. was isolated from a bottom oil obtained during the preparation of acetylene and ethylene by high temperature steam cracking of petroleum naphtha. This fraction contained 85% or more of aromatic compounds and it was hydrodesulfurized and propylated under the conditions shown in Table 9, using a continuous flow reactor, and then rectified to obtain a fraction boiling at 280–310° C.

TABLE 9

| | Hydrodesulfurization | Propylation |
|---|---|---|
| Temperature (° C.) | 380 | 200 |
| Pressure (kg./cm.²) | 25 | 7 |
| Liquid hourly space velocity (LHSV) | 0.6 | 1.0 |
| Hydrogen rate (Nm.³/ton) | 380 | |
| Propylene, molar ratio | | 1.5 |
| Catalyst | Co-Mo-Ni-Al₂O₃ | SiO₂-Al₂O₃ |

The analysis of the fraction by gas chromatography showed that it was composed of 55% of dipropylnaphthalene and 35% of propylmethylnaphthalene in addition to about 10% in total of dipropyltetralin and dipropylmethyltetralin. Microcapsules were prepared using this fraction according to the method described in Examples 1 and 2 (37 grams of mineral oils were incorporated into every 100 g. of this fraction). Carbonless copying papers produced from the microcapsules were all excellent in every respect of odor, color development and light stability.

We claim:

1. In microcapsules for carbonless copying paper, said microcapsules having hydrophilic colloid walls containing a dye composition which is composed of a solvent, a dye and a mineral oil therein, the improvement comprising a dye composition including:
   (a) 100 parts of a solvent comprising one or more alkylnaphthalenes selected from the group consisting of butylnaphthalene, diethylnaphthalene, propylmethylnaphthalene, dimethylpropylnaphthalene, ethylpropylnaphthalene, methylbutylnaphthalene and dipropylnaphthalene,
   (b) 0–100 parts of mineral oil, and
   (c) 0.5–15 parts of a dye which gives color under acidic conditions.

2. Microcapsules for carbonless copying paper according to claim 1 wherein the mineral oil is selected from the group consisting of kereosene, gas oil, insulating oil, lubricating oil, alkylbenzenes, diarylmethanes and their alkyl derivatives.

3. Microcapsules for carbonless paper according to claim 1 wherein the dye which gives color under acidic conditions is selected from the group consisting of leuco dyes of methyl violet, crystal violet, malachite green, rhodamine B, o-hydroxybenzalacetophenone, Michler's hydrol derivatives, indole pyromellitate derivatives, and fluorane derivatives.

References Cited

UNITED STATES PATENTS

| | | | |
|---|---|---|---|
| 2,800,457 | 7/1957 | Green et al. | 252—316 |
| 3,627,581 | 12/1971 | Phillips, Jr. | 252—316 X |

FOREIGN PATENTS

| | | | |
|---|---|---|---|
| 915,342 | 1/1963 | Great Britain | 8—94 |

RICHARD D. LOVERING, Primary Examiner

U.S. Cl. X.R.

8—79, 94; 117—36.2; 264—4

UNITED STATES PATENT OFFICE
CERTIFICATE OF CORRECTION

Patent No. 3,806,463          Dated April 23, 1974

Inventor(s) Konishi, Takahashi, Kumura, and Toguchi

It is certified that error appears in the above-identified patent and that said Letters Patent are hereby corrected as shown below:

Column 5, Table 4, after the line "Butyl-naphthalene...A...A...A" insert the line, --Diethyl-...B...A...A--.

Column 5, Table 4, after the line "Methyl-propyl...A...A...A" delete the line "Pentyl...A...A...A"

Column 6, line 5, delete the word "acetone" and insert therefor the word --lactone--.

Column 6, line 23, delete the word "ad" and insert therefor the word --aid--.

Column 8, line 4, after the word "carbonless" insert the word --copying--.

Signed and sealed this 10th day of September 1974.

(SEAL)
Attest:

McCOY M. GIBSON, JR.          C. MARSHALL DANN
Attesting Officer          Commissioneroof Patents